(12) United States Patent
Tellatin

(10) Patent No.: US 12,309,896 B2
(45) Date of Patent: May 20, 2025

(54) LIGHTING SYSTEM AND CONTROL METHOD OF SAID SYSTEM

(71) Applicant: Ledworks Srl, Mestrino (IT)

(72) Inventor: Andrea Tellatin, Mestrino (IT)

( * ) Notice: Subject to any disclaimer, the term of this patent is extended or adjusted under 35 U.S.C. 154(b) by 0 days.

(21) Appl. No.: 17/766,233

(22) PCT Filed: Oct. 7, 2020

(86) PCT No.: PCT/IB2020/059403
§ 371 (c)(1),
(2) Date: Apr. 2, 2022

(87) PCT Pub. No.: WO2021/070072
PCT Pub. Date: Apr. 15, 2021

(65) Prior Publication Data
US 2024/0057235 A1    Feb. 15, 2024

(30) Foreign Application Priority Data
Oct. 8, 2019   (IT) .......................... 102019000018161

(51) Int. Cl.
*H05B 47/155* (2020.01)
*H05B 47/19* (2020.01)

(52) U.S. Cl.
CPC ........... *H05B 47/155* (2020.01); *H05B 47/19* (2020.01)

(58) Field of Classification Search
None
See application file for complete search history.

(56) References Cited

U.S. PATENT DOCUMENTS

| | | | |
|---|---|---|---|
| 10,045,415 B1* | 8/2018 | Coombes | H05B 45/12 |
| 2013/0293118 A1* | 11/2013 | Nagashima | H05B 47/115 |
| | | | 315/149 |
| 2015/0373812 A1 | 12/2015 | Feri | |
| 2016/0205749 A1* | 7/2016 | Creusen | H05B 47/18 |
| | | | 315/151 |
| 2017/0105270 A1* | 4/2017 | Saes | H05B 47/175 |
| 2019/0101252 A1 | 4/2019 | Renders | |

FOREIGN PATENT DOCUMENTS

WO    20170102419    6/2017

* cited by examiner

*Primary Examiner* — Jany Richardson
(74) *Attorney, Agent, or Firm* — Themis Law

(57) ABSTRACT

A lighting system includes a plurality of lighting devices and a control unit. Each lighting device is configured to respond to command messages that include an identification code of the lighting device, the command signals being generated by the control unit to set the state of each lighting device. Furthermore, each lighting device is configured, upon receipt of the command signal, to emit an electromagnetic signal, detect electromagnetic signals generated by the other lighting devices, and modify the operating parameters of the corresponding lighting device upon detection of the electromagnetic signal, the control unit having a detection system configured to detect the operating parameters of each lighting device.

5 Claims, 2 Drawing Sheets

LIGHTING SYSTEM AND CONTROL METHOD OF SAID SYSTEM

The present invention relates to a lighting system comprising a plurality of lighting devices and a control unit.

Each lighting device is configured to respond to command messages comprising an identification code of the lighting device, generated by said control unit, to set the state of each lighting device.

That described above is the common configuration of lighting systems known in the state of the art, such as the known strips of LED lights used to create light decorations.

With the development of technology in the field of LED lights, as well as to meet the demands of increasingly demanding users, increasingly complex light decorations can be obtained, to the point of creating configurations in which the switching on of lighting devices can be programmed according to different switching-on sequences.

For this reason, "addressable LEDs", "LED Chips" or "LED Pixels" are used in state-of-the-art lighting systems which can be individually controlled by means of a communication bus. For example, the WorldSemi® WS2812 integrated circuit can receive input and output data to cascade multiple chips and controls an RGB (Red, Green and Blue) LED to which it is integrated.

Especially with regard to light decorations, in order to create increasingly pleasant and customizable scenic effects, the control unit's knowledge of the positions of the individual LEDs is essential.

Since the LEDs are in fact randomly positioned, the state-of-the-art systems often require a calibration step in which the user, through specific acquisition means, manages to detect and transmit to the control unit the position of each individual LED or lighting information (for example, by means of remote controls or smartphones) starting from the knowledge of the position of each individual LED.

An example of such systems is described within patent application WO2017/115326.

In this case, the system provides for the use of a camera which captures a specific sequence of LED colour states, in order to associate each LED with a unique code and calculate the position thereof.

This methodology, although particularly efficient, inevitably requires the presence of a user, or at least a camera to acquire the activation step and may also not work precisely in dark environments or in the case of low-resolution cameras.

There is therefore a need not met by the state-of-the-art systems to create a lighting system which allows the position of each individual lighting device to be identified in a simple, fast and automatic manner.

The present invention achieves the above objects by obtaining a lighting system as described above, in which each lighting device is configured to emit an electromagnetic signal at a predetermined frequency upon receipt of the command signal.

The lighting device is also configured to detect electromagnetic signals generated by other lighting devices and to modify the operating parameters of the corresponding lighting device which detected the signal.

Furthermore, the control unit comprises detection means configured to detect the operating parameters of each lighting device.

As will be apparent from the description of the method which is also the object of the present invention, the system described above allows for a self-mapping of all the lighting devices, in which each lighting device "senses" or "sees" the lighting devices adjacent thereto, so that the control unit can recreate a map about the arrangement of the lighting devices.

It is also evident that a system of this type can be strongly customizable and configured as needed by users.

In fact, according to a first embodiment, the electromagnetic signal consists of a light signal.

In addition, each lighting device comprises means for identifying the light signal.

According to this configuration, the chosen lighting device switches on, i.e., emits a light signal, which is detected by the lighting devices at a certain distance, based on the light intensity of the signal emitted.

It is evident that it is possible to set the lighting device to emit a certain light signal with a predetermined frequency and intensity, in order to adjust the reception settings of the identification means belonging to the lighting devices adjacent to the lighting device which emitted the light signal.

According to an improvement, the light signal identification means comprise at least one photodiode.

The photodiode detects the brightness of the activated lighting device at a certain distance.

This aspect is particularly advantageous, as the photodiode exploits the photovoltaic effect, recognizing a certain wavelength of the incident electromagnetic wave, by means of absorbing the photon of the light signal, and transforming this event into an electrical current signal which can contribute to the change of the operating parameters of the lighting device.

According to a possible embodiment, the electromagnetic signal consists of a radio frequency signal.

In this case the lighting device comprises a radio frequency circuit, configured to detect electromagnetic signals generated by the other lighting devices and to modify the operating parameters of the corresponding lighting device which detected the signal.

For the detection and transmission of electromagnetic signals it is in fact possible to envisage that each lighting device comprises an antenna whereby, depending on the material and shape of the antenna, each lighting device will have a limited region of space in which it will communicate with further lighting devices.

Each lighting device also has one or more specific operating parameters, linked to the electrical or physical properties of the device itself, such as current absorption, light intensity, colour, etc.

The control unit is simply responsible for sending the command signal to the specific lighting device and thus detecting the operating parameters of the lighting devices provided at the lighting device and which have detected the electromagnetic signal.

As will be described later in relation to the method object of the present invention, the command signal sent by the control unit sets a specific lighting device in a transmission state, in which the lighting device emits an electromagnetic signal.

The control unit also sets, one at a time, the remaining lighting devices in a receiving state and simultaneously detects the operating parameters, so as to detect a variation of these parameters.

The control unit may for example include a camera for acquiring a different brightness or a different colouration of the one or more lighting devices.

According to a preferred embodiment, the control unit comprises means for measuring the current absorption of the lighting devices.

Generally in fact, changing the operating parameters comprises a change in the power current intensity of each lighting device, whereby the controller may limit itself to detecting such a change to recognize a lighting device adjacent to that to which the command signal was sent.

The evaluation of the variation in current intensity has particularly advantageous aspects in that it is an objective criterion, which is not affected by environmental conditions, and which does not have particularly stringent technological requirements.

As described above, the emitted electromagnetic signal, for example the light signal, may be modulated, so as to diversify the change in the operating parameters of the lighting devices, based on the distance of the lighting device to which the command signal was sent, i.e., the lighting device in transmission state.

For example, the lighting devices which detect the signal and are located between 3 and 6 centimetres from the lighting device to which the command signal has been sent may be expected to turn green, while the lighting devices which are located between 6 and 9 centimetres may turn blue.

Each colour will therefore have its own specific current absorption, which will be detected by the control unit.

Similarly, in the case where the electromagnetic signal consists of a radio frequency signal, a modulation may be provided.

In fact, as anticipated, the radio frequency circuit comprises at least one antenna aimed at propagating the electromagnetic signal emitted by the corresponding lighting device.

The antenna can modulate the electromagnetic signal.

To facilitate the detection of the current absorption, according to a preferred embodiment, the lighting devices are electrically and physically connected to each other.

The control unit is also preferably electrically and physically connected to the lighting devices.

As described above, the system object of the present invention is aimed at generating light effects and scenes, whereby once the control unit is aware of the position of each lighting device, it can control the lighting of each device so as to achieve specific effects.

For this reason, it is advantageously possible to provide that the system comprises a user unit, communicating with the control unit, through which a user can select or customize the effects to be reproduced, in a manner entirely similar to that described in WO2017/115326.

In view of the advantageous aspects described herein, the present invention also relates to a control method of a lighting system.

Preferably the lighting system is obtained according to one or more of the features described above, whereby the control method of the present invention includes knowing the relative position of each lighting device through a self-mapping procedure.

In particular, the method provides the following steps:
a) arranging the plurality of lighting devices in an environment,
b) generating at least one command signal and sending said signal to at least one first lighting device, resulting in setting the transmission state of the first lighting device,
c) the first lighting device generating an electromagnetic signal,
d) setting the receiving state of at least one second lighting device,
e) changing the operating parameters of the second lighting device upon detection of the electromagnetic signal emitted by the first lighting device,
f) detection by the control unit of the operating parameters of said second lighting device,
g) identifying the relative position between the first and second lighting devices.

From a general point of view, therefore, the method object of the present invention may be used to know the relative position of one lighting device with respect to another, simply by detecting a change in the operating parameters.

It is clear from what has been described above that the configuration of the transmission state, i.e., the sending of the electromagnetic signal, of a predetermined lighting device can affect the operating parameters of the adjacent lighting devices, according to the methods described above.

In addition, the execution of the method steps in an iterated manner, i.e., in relation to all the lighting devices belonging to the system covered by the present invention, makes it possible to know the position of all the lighting devices, with the aim of recreating a complete map of the positioning of each individual lighting device with respect to another.

Preferably, the variation of the operating parameters is detected through a step of measuring the current absorption of the chosen lighting device and of which the relative position with respect to the lighting device in transmission mode is to be obtained.

Finally, an iteration step of steps b) to g) is provided for all the lighting devices belonging to the plurality of lighting devices.

A step h) of generating an arrangement map of the lighting devices is therefore provided.

Thanks to this configuration, the control unit will be able to save the mapping of all the lighting devices, so as to generate specific light effects based on the location of the lighting devices.

To obtain the mapping of the various lighting devices, at the end of steps b) to g) carried out recursively (self-mapping procedure), it is possible to use one of the optimization algorithms known in the state of the art, which allow to reconstruct the topology of the lighting devices, in a completely similar manner to how the topologies of "wireless nodes" within networks are reconstructed.

Finally, it is specified that the present invention further relates to an optoelectronic device of the LED (light emitting diode) type or the like comprising at least one photodiode for detecting one or more light signals generated by further devices, said optoelectronic device being configured to modify the operating parameters thereof, upon receipt of said light signal.

Similarly, the present invention also relates to an optoelectronic device of the LED (light emitting diode) type or the like comprising a radio frequency circuit configured to emit an electromagnetic signal at a predetermined frequency upon receipt of a command signal and configured to detect the emission of any emitted electromagnetic signals generated by further lighting devices, modifying the operating parameters thereof.

These and other features and advantages of the present invention will become clearer from the following description of some exemplary embodiments illustrated in the attached drawings in which.

It is specified that the figures annexed to the present patent application indicate an embodiment of the method and system object of the present invention to better understand the specific advantages and features thereof.

Such embodiment is therefore to be understood as an explanation and not as a limitation of the inventive concept of the present invention, namely to provide a lighting system and a control method of said system, capable of performing a self-mapping procedure, i.e., to quickly, accurately and automatically identify the positions of the lighting devices belonging to the system.

Figure 1:
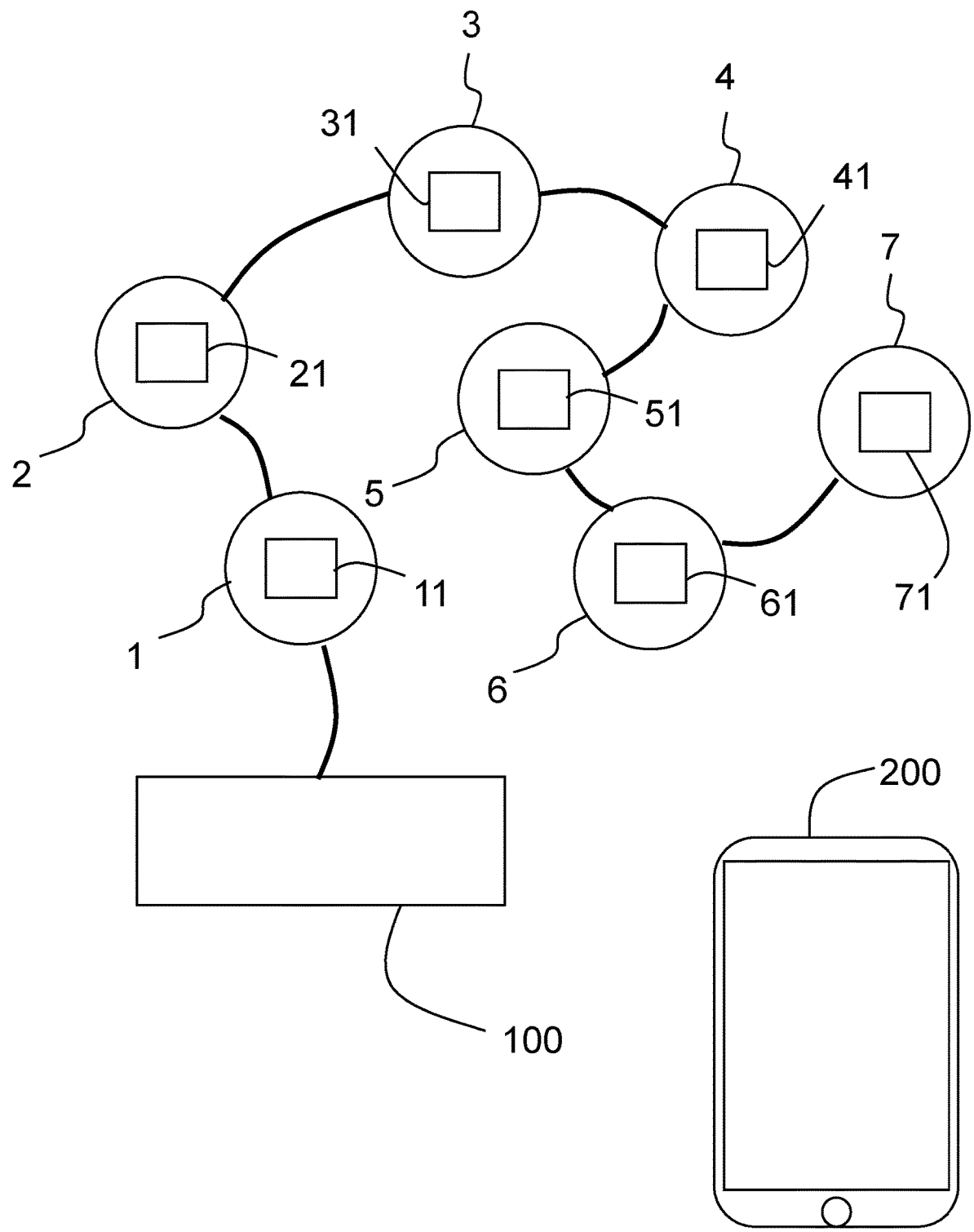
FIG. 1 illustrates a functional diagram of a possible embodiment of the lighting system object of the present invention.

With particular reference to FIG. 1, a possible embodiment of the lighting system object of the present invention is illustrated, in which a plurality of lighting devices 1-7 are provided electrically connected to each other and electrically connected to a control unit 100.

The devices 1-7 in particular consist of addressable LEDs, connected in series, so as to form a string of LEDs in which each LED 1-7 has a unique identification code, so that the control unit 100 can send specific command signals to each LED 1-7.

The LEDs 1-7 are thus obtained equal to each other, each is configured to emit an electromagnetic signal upon receipt of a command signal, sent by the control unit 100. The electromagnetic signal emitted preferably consists of a light signal of a predetermined frequency and intensity emitted by each LED 1-7 which receives the command signal and propagates at a certain distance.

In addition, each LED 1-7 comprises light signal identification means 11-71, configured to detect the emission of light signals generated by the other lighting devices and to modify the operating parameters of the corresponding lighting device 1-7.

As anticipated, such means may consist of photodiodes.

For example, if the control unit 100 sends a command signal to the LED 5, it sets the LED 5 to a transmission state, so that the LED itself will operate so as to emit an electromagnetic signal, such as a light signal, which will propagate in all directions and which can be detected by the LEDs which are at a certain distance, depending on the settings of the LED which emits the signal, i.e., based on the features (frequency and intensity) of the light signal.

The LEDs within such a distance, e.g., the LEDs 3, 4 and 6, will be capable of receiving such a signal, if the control unit has individually set such LEDs to receiving state, in which the corresponding photodiodes 31, 41 and 61 will operate so as to detect the presence of the light signal and change the operating parameters of such LEDs 3, 4 and 6.

As anticipated, each LED 1-7 may be configured to sense an electromagnetic signal consisting of a radio frequency signal.

In this case, each LED may comprise a radio frequency circuit configured to emit an electromagnetic signal at a predetermined frequency upon receipt of a command signal, sent by the control unit.

The radio frequency circuit can be obtained like the circuits known in the state of the art, capable of emitting an electromagnetic "noise" when it receives the command signal from the control unit at a known frequency, thanks to an oscillator inside the circuit.

Inside the circuit there may also be an antenna made of conductive material, capable of propagating the "noise", i.e., the electromagnetic signal for a certain distance.

In addition, each radio frequency circuit may be configured to detect the emission of electromagnetic signals generated by the other lighting devices and to modify the operating parameters of the corresponding lighting device.

Regardless of the nature of the electromagnetic signal, be it light or radio frequency, the operating parameters of the LEDs which are distant, i.e., 1, 2 and 7 from the LED 5 will not be modified even if activated in receiving mode, as they are not affected by the light signal generated by the LED 5.

Changing the operating parameters causes a change in the current absorption of the LEDs 3, 4 and 6, a change which is detected by the control unit 100, by means of special absorption current detection means, of the type known in the art and not shown in the figure.

As a result, the control unit 100, once a command signal is sent to the LED 5, and after sending a command to set the receiving state individually to all available LEDs, will know that the LEDs 3, 4 and 6 are located at such LED 5, as they are affected by the light signal emitted.

Because each LED has a unique identifier code, the control unit 100 may associate the unique code with the location.

It is evident how any arrangement configuration of the LEDs 1-7, as well as any number of LEDs, can be envisaged without changing the features described above, nor the operating methodology which will be described in detail later.

It should also be specified that the system has parameters which can be customized according to the needs of the users and the installation which must be carried out.

For example, it is possible to adjust the emitting distance of the electromagnetic signal, modulating the frequency and intensity of the light signal emitted, so that it diversifies the behaviour of the LEDs based on the distance from the LED which emitted the light signal.

Regardless of the configuration and parameters chosen, it is evident that the sending of the command signals to all the LEDs 1-7 by the control unit 100 allows the knowledge of the topology, i.e., the arrangement of the LEDs 1-7.

Figure 2:
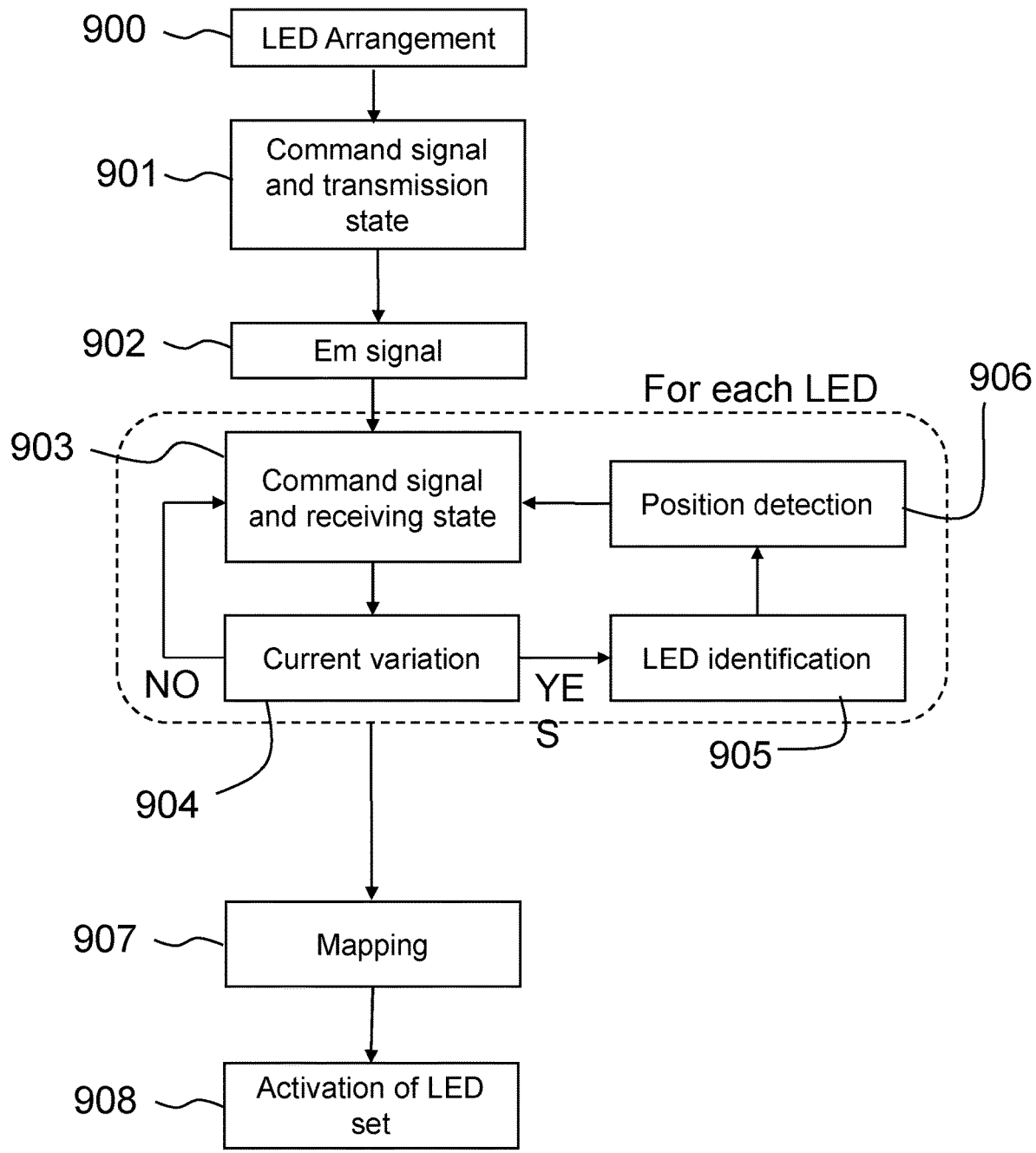
FIG. 2 illustrates a flow chart intended to illustrate the control method steps object of the present invention.

Such analysis is preferably carried out using the steps of the method of the present invention, which are illustrated in FIG. 2.

Once the LEDs 1-7 are arranged in a random location in the environment, e.g., as illustrated in FIG. 1, step 900, the control unit 100 sends at least one command signal to a first LED, step 901.

The command signal sets the LED to transmission mode.

At this point the LED in transmission mode emits an electromagnetic signal, 902, which propagates in all directions.

At the same time, the control unit 100 sends a further command signal to a second LED, so as to set it to receiving mode, step 903.

If the second LED is in receiving state inside the propagation zone, the electromagnetic signal is detected by that LED, and a variation of one or more operating parameters of the same LED, such as a change in current absorption, is provided.

At this point, step 904, the control unit 100 detects the current absorption of the second LED and detects a change in current absorption.

The absorption variation corresponds to a change in the operating parameters which implies a positioning of the second LED, i.e., the LED currently in receiving state, at the first LED, i.e., the LED in the transmission state, for which the relative position thereof with respect to the first LED is detected.

Regardless of the variation in current absorption, steps 903, 904, 905 and 906 are iterated for each separate LED for the first LED, i.e., each LED, apart from the LED set in transmission state, is set from time to time in receiving state.

In this manner, it will be possible to evaluate the proximity of each LED to the first LED.

For example, taking up the case described in relation to FIG. 1, once positioned, the LEDs are switched off, but powered, therefore in a condition of maximum power consumption.

The control unit 100 measures, LED by LED, the current absorption.

The control unit sends a command signal to the LED 5, which is set in transmission state and thus configured to emit the electromagnetic signal.

The control unit puts the LED 3 in receiving state, which detects such electromagnetic signal and modifies the operating parameters thereof accordingly, for example by switching from off to emitting a white colour, therefore in a condition of lower power consumption.

This procedure is performed for all the remaining LEDs 1, 2, 4, 6 and 7.

The LEDs which do not detect the electromagnetic signal emitted by the LED 5, keep their operating parameters unchanged, remain off, continuing to consume current as before.

At the end of the procedure, the control unit 100 measures the current value and if it detects a difference, it is noted that the LEDs 3, 4 and 6 "see" LED 5.

The steps just described are repeated recursively, so that the control unit 100 sets each LED 1-7 in transmission state.

It is evident that once the LED 1 has been set to transmission state and once the LEDs 2 to 7 have been set to receiving state, when the LED 2 is set to transmission state, it will not be necessary to set the LED 1 to receiving state, as the position between the LED 1 and the LED 2 will already be known.

In this way, the steps to be performed to identify the position of each LED 1-7 are limited.

Therefore, once the command signal for setting the transmission state has been sent to each LED, the control unit will be able to know the relative position of each LED with respect to the other and, preferably through known optimization algorithms, it will be able to identify the mapping, step 907, i.e., the topology of the LEDs 1-7.

The mapping obtained in step 907 may then be used to control the LEDs, so as to obtain the scenic effects desired by the user, step 908, based on the layout identified in step 907.

The effects may be stored and pre-programmed within the control unit 100, so that the system is completely independent of the users.

As anticipated, however, a user unit 200, such as a smartphone, tablet, or the like, may be provided which communicates with the control unit 100 to set the operation of the LEDs 1-7.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A lighting system comprising:
a plurality of lighting devices; and
a control unit,
wherein each lighting device is configured to respond to command signals comprising an identification code of the lighting devices, the command signals being generated by said control unit to set a state of each lighting device,
wherein each lighting device is further configured to emit a radio frequency signal, upon receipt of said command signal, and to detect radio frequency signals generated by the other lighting devices without reflecting bodies of the radio frequency signals therebetween, and to modify operating parameters of the corresponding lighting device, upon detection of said radio frequency signal,
wherein said control unit comprises detection means configured to detect operating parameters of each lighting device, and
wherein said detection means consist of current absorption measurement means of the lighting devices.

2. The lighting system according to claim 1, wherein said lighting devices are electrically connected to each other.

3. A control method of a lighting system configured according to claim 1, comprising the following steps:
arranging the plurality of lighting devices in an environment;
generating said command signal and sending said command signal to a first lighting device;
causing the first lighting device to generate the radio frequency signal;
setting a receiving state of a second lighting device without reflecting bodies of the radio frequency signal therebetween;
changing the operating parameters of the second lighting device upon detection of the radio frequency signal emitted by the first lighting device, detected by the control unit of the operating parameters of said second lighting device;
identifying a relative position between the first and second lighting devices; and
wherein the detection of the radio frequency signal comprises measuring a current absorption of the lighting device.

4. The control method according to claim 3, wherein the steps of setting a receiving state, changing the operating parameters, and identifying a relative position are carried out for all the lighting devices except said first lighting device.

5. The control method according to claim 4, further comprising a step of generating an arrangement map of said lighting devices.

* * * * *